Jan. 1, 1963  J. M. E. FRIBERG  3,071,384
SEALING STRUCTURE FOR ROTARY MECHANISM
Filed April 4, 1961
2 Sheets-Sheet 1

INVENTOR
JEAN MARIE EUGÈNE FRIBERG

BY Robertson & Smythe
ATTORNEYS

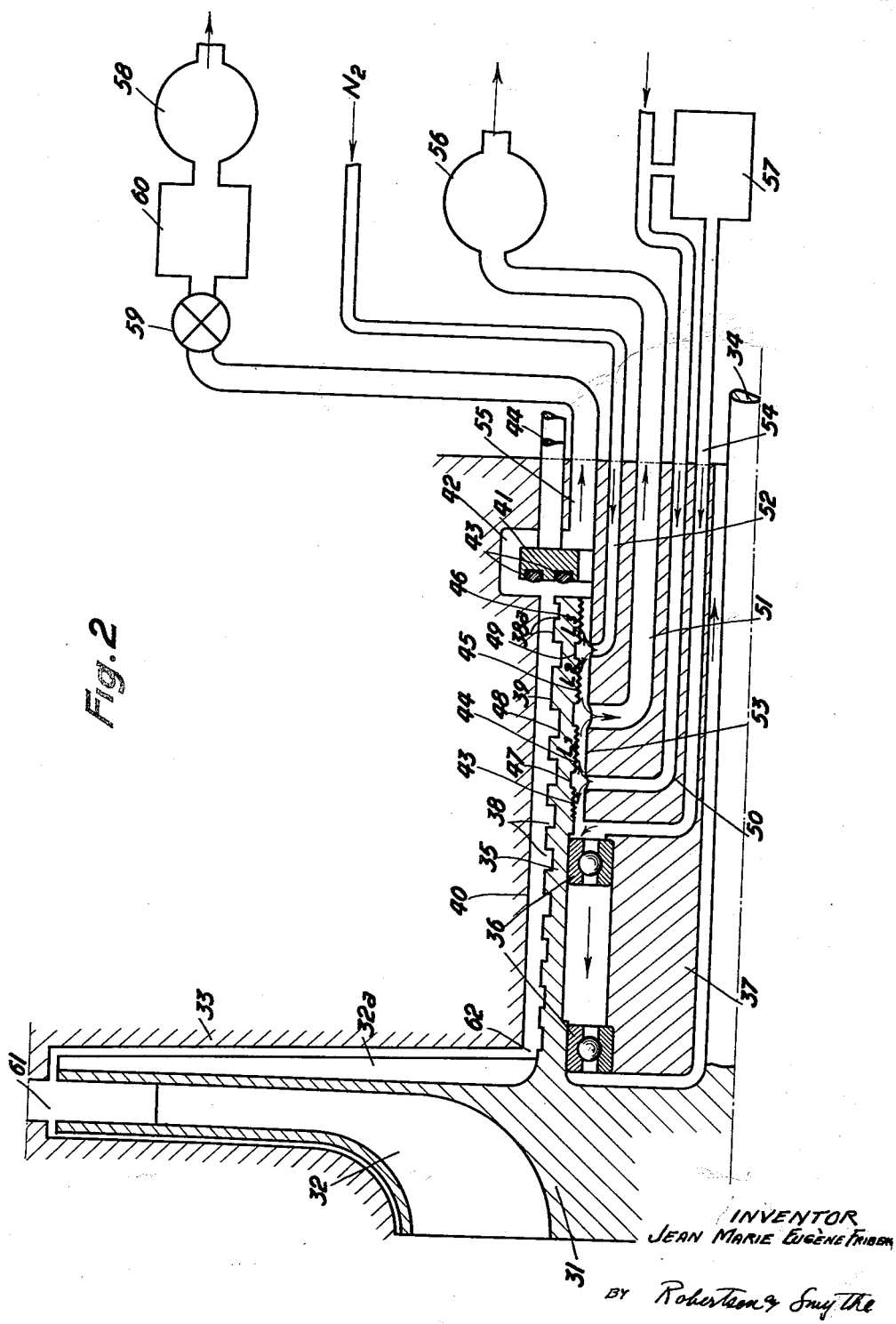

United States Patent Office 3,071,384
Patented Jan. 1, 1963

3,071,384
SEALING STRUCTURE FOR ROTARY
MECHANISM
Jean Marie Eugene Friberg, Bourg la Reine, Seine,
France, assignor to Societe Alsacienne de Constructions Mecaniques, Paris, France, a corporation of France
Filed Apr. 4, 1961, Ser. No. 100,567
Claims priority, application France Apr. 7, 1960
9 Claims. (Cl. 277—3)

This invention relates to rotary mechanism having improved sealing means for isolating different pressure zones of the annular space defined between a stationary and a rotary part of the mechanism.

The invention is more especially though not exclusively directed to improvements in a form of rotary seal disclosed in French Patent No. 1,166,292 and comprising, in a rotary mechanism including a stator and a rotor defining an annular space therebetween, one end of said space containing a first gas at a lower pressure and the opposite end of said space containing a second gas at a higher pressure, sealing structure for isolating said gases from each other comprising a first helical groove of tapered depth formed in one of said surfaces from an intermediate point of said space toward said one end, and a second helical groove of tapered depth and reverse pitch formed in said surface from a point adjacent said intermediate point and extending toward said other end. As explained in said patent, such a sealing structure operates on the principle of a high-vacuum molecular pump of the Holweck type to drive back any molecules of the first gas tending to move from said one end toward said intermediate point back to said one end, and any molecules of the second gas tending to move from said other end back to said other end, thereby maintaining an extremely high vacuum adjacent said intermediate point of the annular space and positively preventing intermingling of the gases.

It may here be pointed out that a principal application of the rotary seal described in the earlier patent (and of the improvement thereto according to the present invention) is the application to compressors for radioactive gas, e.g. uranium hexafluoride, as used in nuclear reactors. In such an application the other gas used as a sealing gas is an inert gas of a high degree of purity such as rectified nitrogen. It is important that the radioactive gas from the compressor be positively prevented from leaking out since it would otherwise raise difficult problems of protection and disposal in view of its highly radioactive condition.

The rotary seal of the earlier French patent operates extremely well, but only provided that the sealing gas such as nitrogen at the outer end of the rotary seal is at a relatively low pressure, of the same order of magnitude as the pressure of the gas, such as uranium hexafluoride, to be sealed off. This pressure may be on the order of 20 mm. Hg. The problem remains, therefore, of sealing off the low-pressure nitrogen (at a pressure not substantially higher and preferably lower, than this pressure of 20 mm. Hg) from the surrounding atmosphere. This problem might of course be solved by pumping sufficiently large amounts of nitrogen to maintain this low nitrogen pressure at the outer end of the rotary seal, but such a solution is very uneconomical especially in view of the high cost of producing the high-purity nitrogen required and the large pumping rates necessary to maintain the low pressure.

It is a specific object of this invention to solve this problem in an economical and effective manner. Broader objects are the provision of improved low-pressure sealing means, and means for isolating two gases at different pressures placed at opposite ends of an annular space defined between a stator structure and a rotor structure or shaft revolving with respect thereto. Other objects will appear.

According to an aspect of this invention, there is provided rotary mechanism including a stator and a rotor defining an annular space between adjacent surfaces thereof said space including a first zone containing a first gas, at a low first pressure and another zone remote from the first zone and containing a second gas at a higher pressure, which mechanism includes sealing structure for isolating said first from said second gas comprising suction means connected with said first zone for maintaining said first pressure thereat, means delivering a third gas into a second zone of the space axially displaced from the first zone toward the other zone at a second pressure intermediate said first and said higher pressure, and further suction means connected with a third zone of said space axially displaced from the second zone toward said other zone for maintaining in the third zone a third pressure somewhat lower than said second pressure.

Embodiments of the invention will now be described for purposes of illustration but not of limitation with reference to the accompanying diagrammatic drawings, wherein:

FIG. 2 is a simplified fragmentary longitudinal sectional view illustrating a compressor having a primary seal constructed in accordance with the earlier French patent, and a secondary seal according to the present invention.

Figure 1:
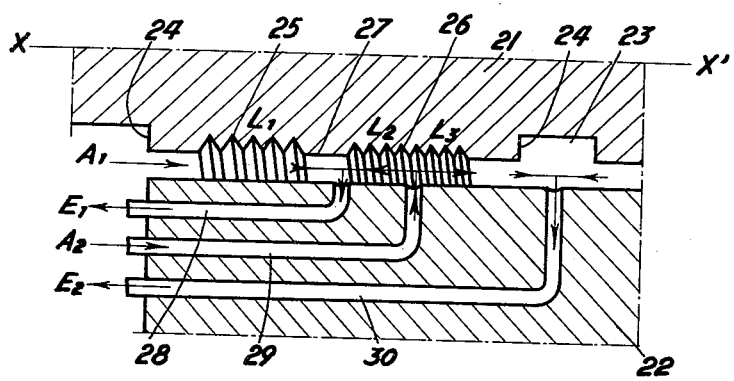
FIG. 1 is a schematic fragmentary sectional view illustrating one half of a rotor shaft and an adjacent portion of a stator structure having an improved rotary sealing structure provided in the annular space defined between them.

The embodiment of FIGURE 2, which will be described first, generally illustrates a compressor of a type used in nuclear reactors for pumping a radioactive gas such as uranium hexafluoride. It is important not to let any substantial amount of this gas leak out through the clearance space between the stator and rotor of the compressor, and to maintain the requisite low pressure in the latter, and it is with this problem that the invention is chiefly concerned.

Referring to FIG. 2, there is illustrated part of a low-pressure pump or compressor including a centrifugal compressor wheel 31 formed with blading 32 and rotatable in a casing generally designated 33. The compressor delivers at its outlet 61 a gas at a subatmospheric outlet pressure, e.g. 200 mm. Hg which may be radioactive uranium hexafluoride as used in a nuclear reactor. Mounted on the rear side of the compressor wheel 31 are auxiliary blades 32a providing an auxiliary centrifugal compressor device. The compressor wheel 31 is secured on a drive shaft 34 and further has a sleeve 35 projecting from it so as coaxially to surround shaft 34 and serving the purposes of a rotor both for the primary and the secondary seals to be described. Sleeve 35 is journalled on spaced bearings 36 around a stationary sleeve-like extension 37 forming part of the casing 33 projecting into the space between shaft 34 and rotary sleeve 35, and the bearings 36 may serve as all or part of the supporting means for the rotational support of the compressor wheel.

It will be understood that to the right (in the drawing) of the casing 33 and immediately around the shaft 34 normal atmospheric pressure may be present, and the purpose of the structure to be described is to seal off this pressure from the low pressure uranium fluoride (at about 20 mm. Hg) present in the region designated 62 at the root of the compressor blading. For this purpose there is provided a first or primary seal arrangement which is similar to that disclosed in the aforementioned French patent, and positioned generally between the outer surface of rotary sleeve 35 and the surrounding inner stator surface 40 of casing 33. This primary seal comprises a pair of helical grooves of reverse pitch 38 and 38a formed on the outer cylindrical surface of sleeve 35 and both leading away from an intermediate cylindrical portion or land 39 of said sleeve, in opposite axial directions therefrom. The groove 38 leading toward the compressor wheel 31 is the longer of the two being shown as including 8 turns, whereas the other helical groove 38a is shown with only two turns. Both helical grooves are formed with a depth that is gradually decreasing from the intermediate land 39 toward the outer ends of the respective grooves. The shorter groove 38a opens at its outer end into an annular chamber 42 formed in the stator or casing 33 and connecting with a conduit 55 leading to a vacuum pump 58 through a valve 59 and an uranium hexafluoride trap or separator 60 as later described. Further, there is mounted within the annular chamber 42 an annular seal member 41 reciprocable through rods 44 in directions parallel to the axis of the system, and in operation the ring member 41 is arranged to be automatically displaced leftward so as to bring flexible annular seal strips 43 provided on its left side into sealing engagement with the outlet of the primary seal, on the compressor decelerating to below a prescribed value prior to stopping. This seal member 41—43 serves to provide an ordinary static seal during idle periods of the compressor.

As earlier explained herein and in the aforementioned French patent, the action of the primary seal including the dual helical groove arrangement described is to act as a high-vacuum molecular pump of the Holweck type. Thus, with the annular chamber 42 being connected with a source of inert gas such as high-purity nitrogen at a relatively low pressure approximately equal to or somewhat lower than the uranium fluoride gas pressure at the left-hand end of helical groove 38, the helical groove 38 acts to drive any stray uranium fluoride gas molecules tending to flow rightward along the annular space between the rotor and stator surfaces back toward the compressor wheel, and similarly the reverse-pitch helical groove 38a would drive back any nitrogen molecules tending to stray into said space from the chamber 42, thus maintaining an extremely high degree of vacuum in the region of land 39 intermediate the two helical grooves and positively preventing egress of the uranium hexafluoride from the compressor and ingress of the nitrogen into the compressor.

However, the known type of operation just described is satisfactory only if the pressure differential between the two gaseous atmospheres (such as uranium fluoride and nitrogen in the case just referred to) is not too great, i.e. provided the gas pressure in chamber 42 is not too much higher than the compressor inlet pressure. To achieve such a low nitrogen pressure in chamber 42 while using a conventional secondary seal (e.g. of the ordinary labyrinth type) to isolate the low-pressure nitrogen in chamber 42 from the outer atmosphere, it would, normally be necessary to pump the nitrogen at excessively high flow rates through said chamber, thereby seriously complicating the apparatus and gravely increasing operating expenses in view of the high cost of the extremely high grade of purity required of the nitrogen in such nuclear installations. These difficulties are overcome, in the system described, by providing a secondary seal of improved character now to be described for isolating low-pressure chamber 42 from the atmosphere.

The secondary seal which forms the main feature of this invention is generally positioned, in the embodiment shown, within the annular space defined between the inner surface of revolving sleeve 35 and the outer surface 53 of the casing sleeve extension 31. While such a lay-out is advantageous in that it reduces the over-all axial dimensions of the primary and secondary seal assembly, it should be understood that the secondary seal may, if preferred, be disposed generally on the same cylindrical surface as the primary seal above described, beyond the chamber 42.

As shown, to provide the secondary seal of the invention the inner cylindrical surface of rotatable sleeve 35 is formed with four axially spaced serrated sections 43, 44, 45 and 46 separated by smooth annular grooves 47, 48 and 49. The serrations formed in sections 43, 44, 45 and 46 may be circumferential grooves or may be helical grooves or screw threads. While the serrations may be omitted and the corresponding sections 43 through 46 formed as smooth lands, it is preferred according to the invention to provide the serrations as shown since this is found to improve the effectiveness of the seal.

Formed in the casing portion 37 are a number of ducts, including the three ducts 50, 51 and 52 which open at the outer surface of casing portion 37 respectively adjacent the grooves 47, 48 and 49. Duct 50 has its free end connected with a source of compressed air at a slightly superatmospheric pressure; duct 51 connects with a vacuum pump 56 providing a moderate vacuum of say about 100 mm. Hg, and duct 52 connects at its outer end with a source of high-purity nitrogen at a pressure somewhat higher than the vacuum source 56, say a nitrogen pressure of about 150 mm. An additional duct 54 formed in casing part 37 and delivering at a point adjacent bearing 36 has its outer end connected with the outlet of an oil-and-air mixer 57 which delivers a fine oil spray at substantially atmospheric pressure for lubricating and cooling the bearings, which spray traverses both bearings as indicated by the arrow and finally escapes to atmosphere or a reservoir by way of the annular space between inner compressor shaft 34 and the inner surface of casing part 37. The oil-air mixer 57 is shown supplied from the same source of compressed air as the duct 50.

Thus it is seen that at the inner or left hand end of the secondary seal arrangement described, i.e. adjacent bearings 36, atmospheric pressure obtains. The function of the secondary seal is to isolate this atmospheric pressure from the very low nitrogen pressure that is to be maintained in the chamber 42 at the outer end of the primary seal. The nitrogen pressure in chamber 42 is maintained at a low value, preferably less than 20 mm. Hg, e.g. 3 mm. Hg, by the action of the high-vacuum pump 58.

The air at slightly superatmospheric pressure delivered through duct 50 adjacent groove 47, at A1, serves to prevent the oil in the spray delivered through 54 from flowing rightward into the seal, and part of said air A1 therefore escapes with said oil spray through the bearings and out of the system, simultaneously cooling said bearings. Another part of said air, free of oil, is passed rightward across the serrated section 44 which constitutes the first land L1 of the secondary seal, and is sucked out of the system through duct 51 by the moderate-vacuum pump 56 (e.g. at 100 mm. Hg).

The nitrogen as delivered through duct 52 at the moderate pressure of 150 mm. Hg in this example is, in part, also drawn off through duct 51 across the serrated section 45 (zone L2 of the seal), but a major part of this nitrogen is drawn into annular chamber 42 in view of the much higher vacuum created by the high-vacuum pump 58. Simultaneously the pump 58 draws off through duct 55 any residual traces of uranium hexafluoride that may have succeeded in passing out of the compressor through the primary seal, and such traces are trapped in the separator 60 by crystallization at very low temperature obtained e.g. by circulating liquid nitrogen between the walls of the separator.

Figure 3:
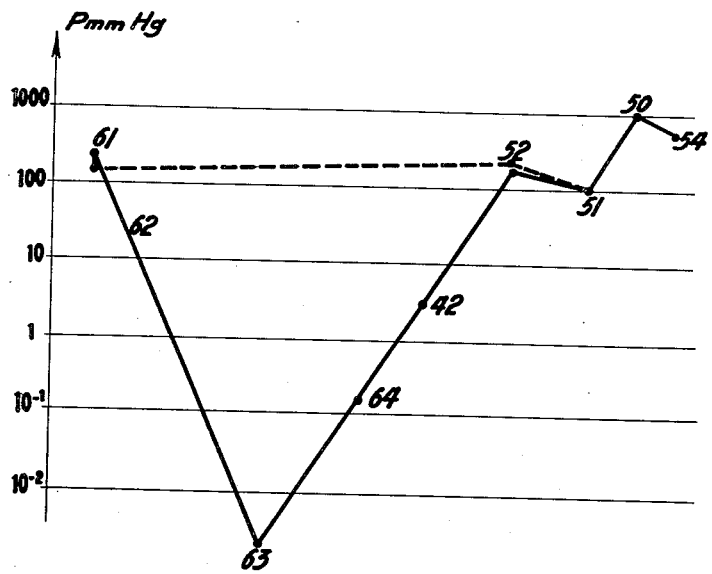
FIGURE 3 is a graph indicating the pressures occurring at various points in the flowpath of the system.

The pressure conditions in the system can be more readily grasped from the chart of FIG. 3 where pressures are plotted in ordinates on a logarithmic scale, while various important points of the system considered along a flow-path extending from the outlet point 61 of the compressor, across the primary seal and then the secondary seal and to atmosphere, are indicated on the abscissa axis on an arbitrary scale. The full line graph indicates the conditions during rotation of the compressor, while the dotted-line graph relates to the idle condition of the system. Points 63 and 64 respectively refer to the starting points of the two opposite helical grooves 38 and 38a of the primary seal, i.e. to points on either side of the smooth land 39 intermediate said grooves. It is noted that at both these points, and particularly at point 63 which is the origin of helical groove 38, an extremely high vacuum is present, indicating a substantially complete isolation between the uranium hexafluoride atmosphere in the compressor and the nitrogen atmosphere pumped into the outer end of the primary seal. The chart simultaneously shows, in the portion of the graph relating to the secondary seal i.e. from point 42 to point 50 (or 54) of the graph, that the relatively low nitrogen pressure which is required to be maintained at point 42 to permit the aforesaid isolation to be effectively accomplished by the operation of the primary seal, is obtained as the result of only a moderate drop in nitrogen pressure from 150 to 3 mm. Hg while the seal between the higher-pressure nitrogen and the atmospheric or higher-pressure air is provided principally by way of the low-vacuum suction through duct 51, which provides an effective separation between the atmospheric or superatmospheric pressure lubricating oil spray, and the high-purity nitrogen serving as the sealing meduim.

A schematic presentation of a secondary seal according to this invention is given in FIG. 1 apart from the primary seal, for providing a better understanding of the fundamental structure and operation of the invention. In this figure, there is shown in axial section the lower half of a shaft or other rotor structure 21 and a portion of a casing or other stator structure 22, and a seal arrangement according to the invention is provided in the adjacent surfaces of the rotor and stator to isolate the left side of the assembly, which may be at atmospheric pressure, from the right side which is at a lower gaseous pressure. Said right side may be (but not necessarily is) connected with the outer end of a primary seal of the type earlier specified. Thus the annular chamber 24 here shown as formed in the rotor 21 corresponds in function to the chamber 42 in FIGURE 2 in which a low pressure of pure nitrogen, or other valuable sealing gas, is to be maintained. The secondary seal comprises two spaced sections 25 and 26 of the rotor in which serrations, e.g. screw threads, are provided, separated by the smooth portion 27. Formed through the stator are the ducts 28, 29 and 30. Duct 27 delivers into the annular space adjacent the smooth section 27, and is connected at its outer end with a source of moderate vacuum E1, corresponding to the moderate vacuum pump 56 of FIG. 2. Duct 29 delivers at a point intermediate the length of the serrated section 26 and is connected at its outer end with a source A2 of the valuable sealing gas (e.g. nitrogen) at a pressure only slightly higher than E1, this duct therefore corresponding to duct 52 of FIG. 2. Duct 30 delivers into the low-pressure chamber 24 and is connected at its outer end with a source E2 of high-vacuum such as the pump 58 of FIG. 2 for maintaining the requisite low pressure in chamber 24. Thus it is seen that the rotor 21 is subdivided into three seal sections L1, L2 and L3. Atmospheric air is admitted at A1 into zone L1. This air together with a minor proportion of the valuable gas is withdrawn at moderately low pressure at E1. Most of the sealing gas discharged into the system from A2 is passed into the chamber 24 and serves to maintain there a low pressure of the sealing gas, while requiring a considerably lower amount of this valuable gas to be delivered per unit time than would be required in the absence of the sealing structure just described.

In this connection it is recalled that the leakage flow across a sealing section such as L1, L2 or L3 is approximately proportional to the difference between the squares of the pressures present at the opposite ends of such section. Hence the leakage flow across sealing zones L2 and L3 is much lower than would occur across a single sealing zone, such as L1, across which a large pressure difference would have to be maintained. Thus the seal of the invention saves a considerable amount of the valuable gas that would otherwise be lost through leakage across the zone L2.

What I claim is:

1. In rotary mechanism including a stator and rotor defining an axially elongated annular space between adjacent surfaces thereof, the combination comprising: suction means connected with a first zone of said space for maintaining a low first pressure in said first zone; means delivering a relatively valuable gas into a second zone of said space axially displaced from the first zone at a second pressure substantially higher than said first pressure; further suction means connected with a third zone of said space axially displaced from the second zone away from the first zone for maintaining in said third zone a third pressure somewhat lower than said second pressure, and means delivering a low-valued gas into said space in a fourth zone thereof axially displaced from the third zone away from the first and second zones at a fourth pressure substantially higher than said second pressure.

2. The combination claimed in claim 1 wherein said low-valued gas comprises air and said fourth pressure is substantially atmospheric pressure.

3. The combination claimed in claim 1 wherein said duct means are formed in said stator.

4. The combination claimed in claim 1, including generally circumferential serrations formed in one of said adjacent surfaces over at least part of the axial extent thereof from said first to said fourth zone.

5. The combination claimed in claim 1, including generally circumferential serrations formed in the surface of said rotor between adjacent ones of said zones.

6. In rotary mechanism including a stator and a rotor defining an axially elongated annular space between adjacent surfaces thereof, and wherein one end of said space is at a substantially lower gaseous pressure than the surrounding atmosphere, means for isolating said one end of said space from the atmosphere comprising: a first helical groove formed in one of said surfaces and extending from a first point spaced from said one end of said space toward said one end with the depth of the groove decreasing along said first groove; a second helical groove formed in said one surface and extending from a point axially spaced from said first point in reverse sense from said first groove with the depth of the groove decreasing along said second groove; suction means connected with a first zone of said space adjacent the end of the second groove remote from the first groove for maintaining a low pressure in said first zone of similar order of magnitude to the low pressure at said one end of said space; means delivering a first gas into a second zone of the space axially displaced from the first zone away from said one end thereof at a second pressure intermediate said first zone pressure and the pressure of the surrounding atmosphere; further suction means connected with a third zone of said space axially displaced from the second zone away from the first zone for maintaining in said third zone a third pressure somewhat lower than said second pressure; and means applying the pressure of said surrounding atmosphere to a fourth zone of said annular space axially displaced from the third zone and adjacent the opposite end of said space.

7. In rotary mechanism including a stator and a rotor defining an annular space between adjacent surfaces thereof and wherein one end of said space contains a first gas at a lower pressure and the opposite end of said space contains a second gas at a higher pressure, means for isolating said gases comprising: a first helical groove of tapered depth formed in said rotor surface from an intermediate point of said space towards said one end; a second helical groove of tapered depth formed in said rotor surface from a point adjacent said intermediate point towards said other end; suction means connected with said space at a zone adjacent the shallow end of the second groove for maintaining a low pressure in said zone generally similar to said lower gas pressure; means delivering a third gas into said space at another zone displaced from said zone away from said one end at a pressure intermediate said lower and higher gas pressures; further suction means connected with said space at a point displaced from said other zone for applying at said last point a further pressure somewhat lower than said intermediate pressure; whereby said second gas applied at said opposite end will be drawn out by said further suction means and said third gas will be drawn out by said first suction means.

8. The combination claimed in claim 6 wherein said rotor comprises a tubular extension projecting between coaxial surfaces of said stator, said extension having an inner and an outer cylindrical surface, and wherein said helical grooves are formed on one of the cylindrical surfaces of the rotor extension and said zones are generally provided adjacent the other of said cylindrical rotor surfaces.

9. The combination claimed in claim 8 wherein said helical grooves are formed on the outer cylindrical surface of the rotor extension.

References Cited in the file of this patent

UNITED STATES PATENTS

| | | |
|---|---|---|
| 2,721,747 | Whitfield | Oct. 25, 1955 |
| 2,903,280 | Cuny | Sept. 8, 1959 |

UNITED STATES PATENT OFFICE
CERTIFICATE OF CORRECTION

Patent No. 3,071,384 January 1, 1963

Jean Marie Eugene Friberg

It is hereby certified that error appears in the above numbered patent requiring correction and that the said Letters Patent should read as corrected below.

Column 4, line 59, for "as" read -- gas --.

Signed and sealed this 5th day of November 1963.

(SEAL)
Attest:

ERNEST W. SWIDER
Attesting Officer

EDWIN L. REYNOLDS
Acting Commissioner of Patents